United States Patent

Kaneko et al.

[11] Patent Number: 5,986,232
[45] Date of Patent: Nov. 16, 1999

[54] ELECTRICAL DISCHARGE MACHINING APPARATUS AND ELECTRICAL DISCHARGE MACHINING METHOD

[75] Inventors: Yuji Kaneko; Tatsuo Toyonaga, both of Yokohama, Japan

[73] Assignee: Sodick Co., Ltd., Kanagawa, Japan

[21] Appl. No.: 08/875,922

[22] PCT Filed: Dec. 27, 1996

[86] PCT No.: PCT/JP96/03890

§ 371 Date: Aug. 11, 1997

§ 102(e) Date: Aug. 11, 1997

[87] PCT Pub. No.: WO97/24202

PCT Pub. Date: Jul. 10, 1997

[30] Foreign Application Priority Data

Dec. 28, 1995 [JP] Japan .................................. 7-352175

[51] Int. Cl.$^6$ ............................................. B23H 1/02
[52] U.S. Cl. ............................................. 219/69.18
[58] Field of Search ........................ 219/69.13, 69.18

[56] References Cited

U.S. PATENT DOCUMENTS

| | | | |
|---|---|---|---|
| 5,345,053 | 9/1994 | Kaneko et al. | 219/69.18 |
| 5,380,974 | 1/1995 | Kaneko | 219/69.18 |
| 5,416,290 | 5/1995 | Magara et al. | 219/69.18 |
| 5,475,195 | 12/1995 | Delpretti | 219/69.18 |
| 5,753,882 | 5/1998 | Goto et al. | 219/69.18 |

FOREIGN PATENT DOCUMENTS

| | | |
|---|---|---|
| 61-4620 | 1/1986 | Japan . |
| 63-68317 | 3/1988 | Japan . |
| 5-37766 | 6/1993 | Japan . |

*Primary Examiner*—Geoffrey S. Evans
*Attorney, Agent, or Firm*—McDermott, Will & Emery

[57] ABSTRACT

An electrical discharge detector (30) which detects electrical discharge generated at a machining gap; a pulse generator (41) which generates a pulse signal which stops after the commencement of electrical discharge in response to the electrical discharge detector; first switching circuits (22A, 22D) which apply voltage pulses of one polarity in response to the pulse signal; second switching circuits (22B, 22C), which apply voltage pulses of the opposite polarity to the machining gap in response to the pulse signal; a flip-flop (46) which retains one of two states; a gate circuit (42, 43) which supplies a pulse signal to the first switching circuit when one state is retained in the flip-flop, and supplies a pulse signal to the second switching circuit when the other state is retained in the flip-flop; circuits (CK, 48, 49) which supply a high frequency pulse to the flip-flop for the duration of the pulse signal; a circuit (44) which supplies a single pulse to the flip-flop each time the pulse signal is inactive; and a machining current supply circuit (10), which supplies a machining current to the machining gap after the commencement of electrical discharge.

3 Claims, 5 Drawing Sheets

FIG. 3(A) K 
FIG. 3(B) GP2 
FIG. 3(C) GP1 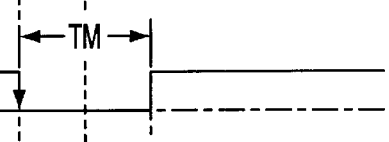
FIG. 3(D) Vgap 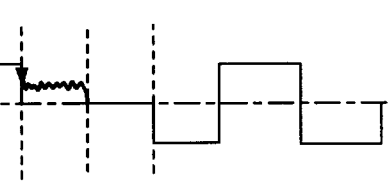
FIG. 3(E) CK 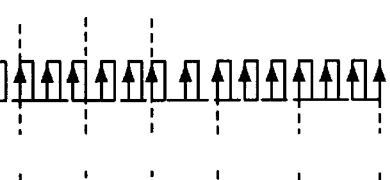
FIG. 3(F) A=B 
FIG. 3(G) T-F/F Q 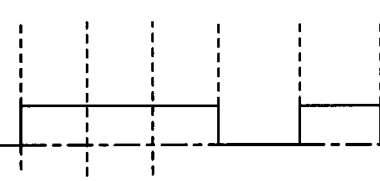
FIG. 3(H) S1 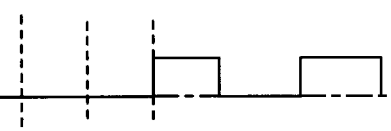
FIG. 3(I) S2 

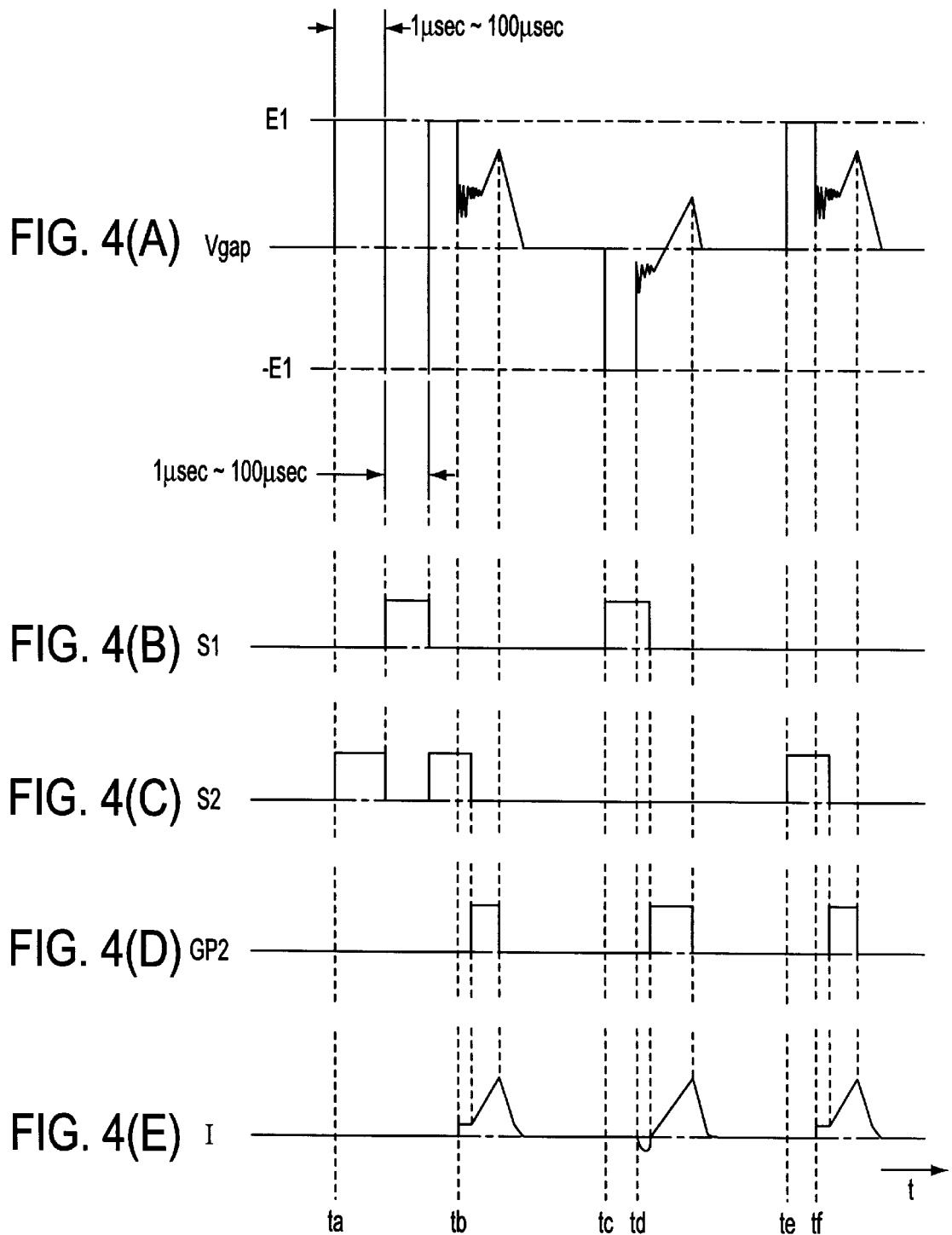

5,986,232

ELECTRICAL DISCHARGE MACHINING APPARATUS AND ELECTRICAL DISCHARGE MACHINING METHOD

TECHNICAL FIELD

The present invention relates to an electrical discharge machining apparatus and method for machining a workpiece by electrical discharges using a tool electrode. In particular, the invention relates to an apparatus and method whereby, using a water-based dielectric fluid, electrical power pulses are supplied to a gap formed between a tool electrode and a workpiece.

BACKGROUND TECHNOLOGY

When a direct current voltage is supplied to a gap while water or a water-based dielectric fluid is supplied to a machining gap formed between a conductive workpiece and a tool electrode, the quality of the workpiece, which is typically held at a positive polarity relative to the tool electrode, may be adversely affected by electrical corrosion due to an undesirable flow of current through a dielectric fluid having a reduced electrical resistivity. In order to suppress this electrolytic effect, Japan Patent Publication 5-37766 discloses an electrical discharge machining power supply comprising a first power supply, which applies a high frequency alternating current voltage to the machining gap, and a second power supply, which supplies a direct current to the machining gap immediately upon commencement of an electrical discharge. In this disclosure, the first power supply is applied to the machining gap through a connecting circuit such as a transformer or capacitor. Therefore, a portion of the current fed from the second power supply to the machining gap may flow through the connecting circuit to the first power supply, reducing machining energy.

DISCLOSURE OF THE INVENTION

The object of the present invention is to provide an electrical discharge machining apparatus and method which maintains high machining efficiency while quickly suppressing undesirable electrolytic effects.

Other objects of the present invention will in part be described below, and will in part become clear to practitioners of the art through implementation of the invention.

In order to achieve the above and other objectives, the electrical discharge machining device of the present invention, which machines a workpiece by generating an electrical discharge in a machining gap formed between a workpiece and a tool electrode, comprises an electrical discharge detector which detects the electrical discharges generated at the machining gap; a pulse generator which generates a pulse signal response, to the electrical discharge detector, which becomes inactive after electrical discharge commences; a first switching circuit which applies a voltage pulse of one polarity to the machining gap in response to the pulse signal; a second switching circuit which applies a voltage pulse of the opposite polarity to the machining gap in response to the pulse signal; a flip-flop which stores one of two states; a gate circuit which gates the pulse signal to the first switching circuit when one state is stored in the flip-flop, and which gates the pulse signal to the second switching circuit when the other state is stored in the flip-flop; a circuit which supplies a high frequency pulse to the flip-flop while a pulse signal continues; a circuit which supplies a single pulse to the flip-flop each time the pulse signal stops; and a machining current supply circuit which supplies a machining current to the machining gap after electrical discharge commences, in response to the electrical discharge detector.

Furthermore, the method of the present invention for machining a workpiece by generating electrical discharges in the machining gap formed between a workpiece and a tool electrode comprises the steps of alternately applying a voltage pulse of one polarity and a voltage pulse of the opposite polarity to a machining gap; detecting electrical discharge generated at the machining gap; interrupting application of a voltage to the machining gap after commencement of an electrical discharge; supplying machining current to the machining gap after the commencement of an electrical discharge; applying a voltage pulse, having a polarity opposite to that of the voltage pulse which follows the start of electrical discharge to the machining gap after electrical discharge ends.

BRIEF DESCRIPTION OF DIAGRAMS

Figure 1:
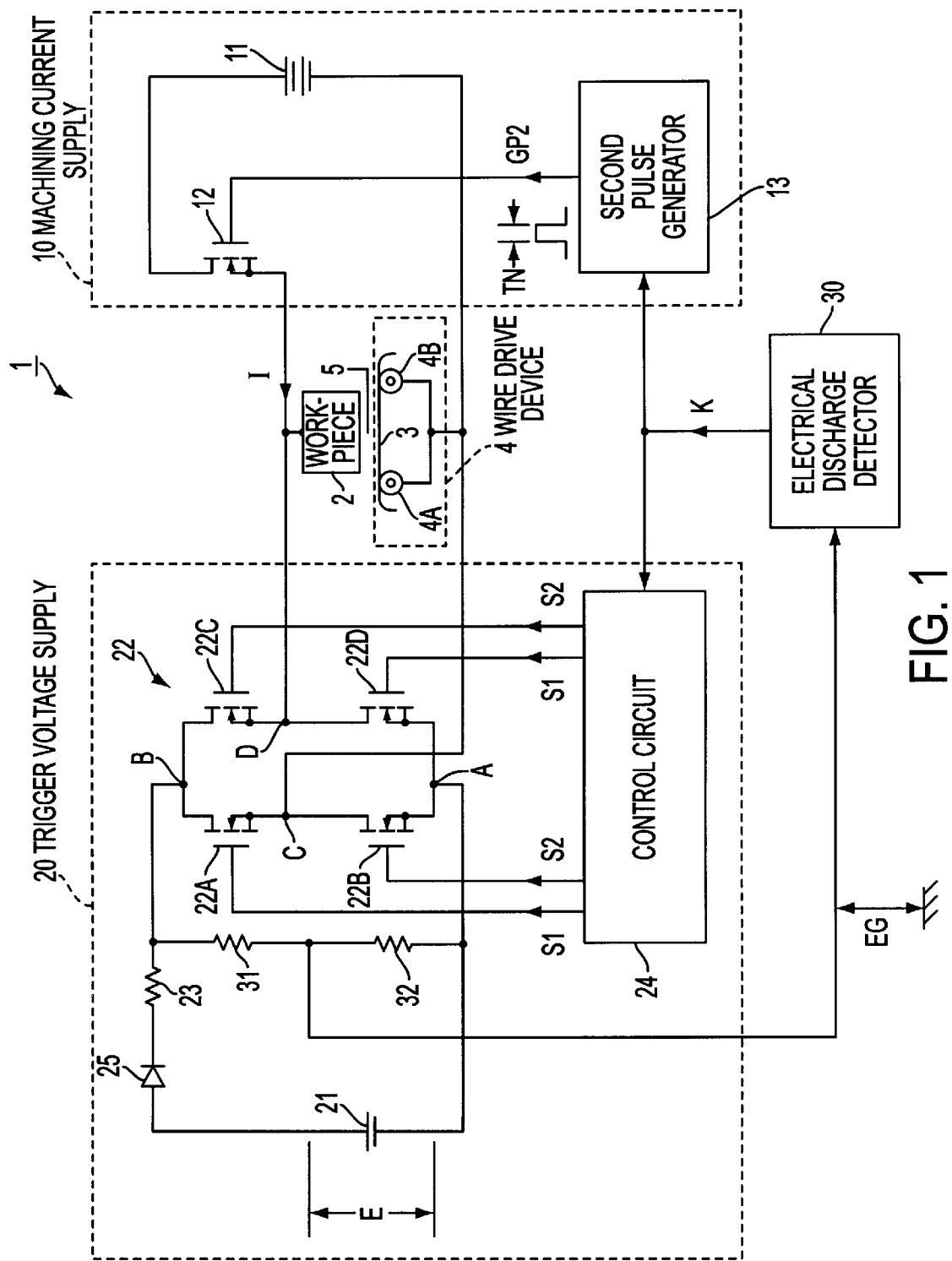
FIG. 1 is a block diagram illustrating an embodiment of the present invention applied to a wire cut electrical discharge machining apparatus.

FIGS. 3(A), 3(B), 3(C), 3(D), 3(E), 3(F), 3(G), 3(H), and 3(I) are timing charts illustrating the operations of the second pulse generator and the control circuit depicted in FIG. 1.

FIGS. 4(A), 4(B), 4(C), 4(D), and 4(E) are timing charts illustrating the respective waveforms for the pulse signals supplied to the switching transistors illustrated in FIG. 1, and the respective voltage and current waveforms at the machining gap.

Figure 5:
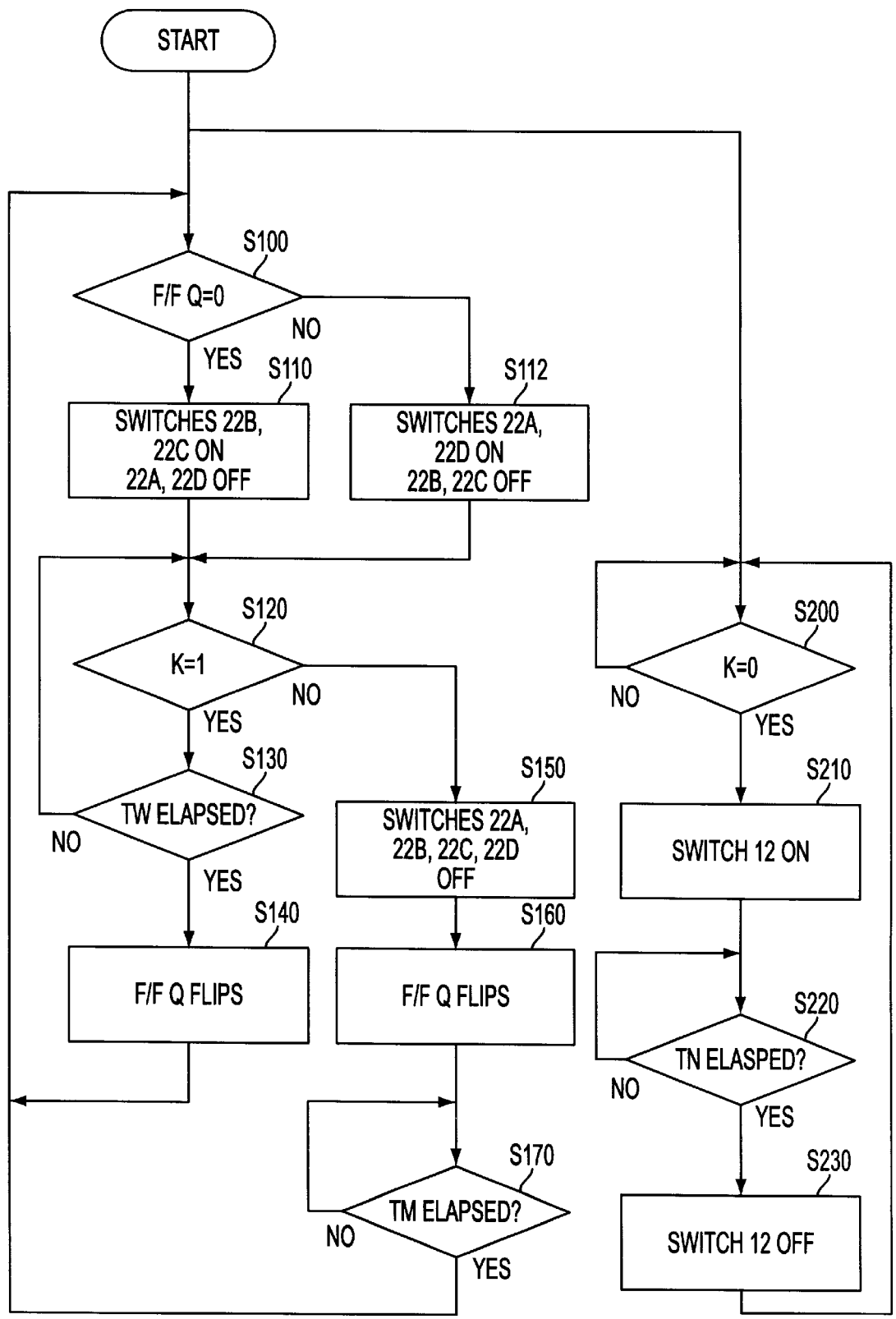

FIG. 5 is a flow chart illustrating the operation of the electrical discharge detector, the second pulse generator, and the control circuit shown in FIG. 1.

PREFERRED EMBODIMENT OF THE INVENTION

An embodiment of the present invention as applied in a wire cut electrical discharge machining apparatus will be explained with reference to the diagrams. As illustrated in FIG. 1, a wire cut electrical discharge machining apparatus 1 may comprise a wire drive device 4, which transports a wire electrode 3, unwound from a bobbin (not shown) along a specified transport path. The wire drive device 4 has conductivity pieces 4A and 4B, which feed current to the traveling wire electrode 3 while it moves along the wire transport path. A workpiece 2 is positioned facing the wire electrode 3, and a machining gap 5 is formed between the workpiece 2 and the traveling wire electrode 3. The mechanical portion of the wire cut electrical discharge machining apparatus 1 has a known construction, and a detailed explanation thereof is thus omitted.

The wire cut electrical discharge machining apparatus 1 further comprises a machining current supply circuit 10 which supplies electrical energy to the gap 5 in order to machine the workpiece 2. The machining current supply circuit 10 comprises a direct current power supply 11, the negative terminal of which is electrically connected to the wire electrode 3 through the conductivity pieces 4A and 4B, and the positive terminal of which is electrically connected to the workpiece 2. And a switching transistor 12 is provided between the positive terminal of the direct current power supply 11 and the workpiece 2. Also, the machining current supply circuit 10 comprises a second pulse generator 13, which supplies a gate pulse signal GP2 which turns on the switching transistor 12 in response to an electrical discharge. Machining current I is supplied to the machining gap from the direct current power supply 11 in accordance with the signal GP2, which is at a "1" level for the time duration TN.

The time duration TN determines the time during which the machining current I flows through the gap 5, and is set, for example, by a thumbwheel switch provided in the second pulse generator 13. Data indicating the time TN may also be provided externally, e.g., in the form of a digital signal input to the second pulse generator 13.

Furthermore, the wire cut electrical discharge machining apparatus 1 comprises a trigger voltage supply section 20, which alternately applies voltage pulses of one polarity and voltage pulses of the opposite polarity to the gap 5 in order to generate electrical discharge at the gap 5. The trigger voltage supply section 20 comprises a direct current power supply 21 and a switching circuit 22, which switches the polarity of the voltage pulses. The switching circuit 22, as illustrated in FIG. 1, is a bridge circuit which comprises serially connected switching transistors 22A, 22B, 22D, and 22C. The switching transistor 22B and 22D connection point A is connected to the negative terminal of the direct current power supply 21, and the switching transistor 22C and 22A connection point B is connected to the positive terminal of the direct current power supply 21 through a current limiting resistor 23 and a diode 25. The switching transistor 22A and 22B connection point C is electrically connected to the wire electrode 3 via the conductivity pieces 4A and 4B. The switching transistor 22D and 22C connecting point D is electrically connected to the workpiece 2.

When one pair of switching transistors 22A and 22D is on, and the other pair of switching transistors 22B and 22C is off, direct current voltage pulses are supplied to the gap 5 from the direct current power supply 21 in a state in which the workpiece 2 has a negative potential, and the wire electrode 3 has a positive potential—so-called "reverse polarity." When machining under such a reverse polarity state, parts which are electrically connected to the wire electrode 3—for example, the conductivity pieces 4A and 4B—may be subjected to an electrolytic effect. When the other pair of switching transistors 22B and 22C is on, and the pair of switching transistors 22A and 22D is off—the so-called "straight polarity" state—direct current voltage pulses from direct current power supply 21 are applied to the gap 5. During electrical discharge machining in this straight polarity state, the workpiece 2 may be subjected to electrical corrosion. The cycle over which the voltage pulse polarity changes is determined by the cycle at which the switching transistor pairs are repeatedly switched on and off.

Furthermore, the trigger voltage supply section 20 comprises a control circuit 24, which alternately switches one pair of switching transistors and the other pair of switching transistors at high speed between their on and off states in order to alternately apply straight polarity voltage pulses and reverse polarity voltage pulses to the gap 5. The control circuit 24 output pulse S1 is supplied to one pair of switching transistors 22A and 22D, and the output pulse S2 is supplied to the other pair of switching transistors 22B and 22C. In order to generate electrical discharges, the control circuit 24 alternately turns each of the pairs of switching transistors on, each for a short time interval TW, and turns both pairs of switching transistors off for an inactive time interval, TM, immediately following the commencement of electrical discharge. This inactive time TM is longer than the duration TN set in the second pulse generator 13. The difference between time TM and time TN determines the period during which no voltage is applied to the gap 5.

The wire cut electrical discharge machining apparatus 1 also comprises an electrical discharge detector 30, which detects electrical discharges caused by the application of high frequency voltage pulses from the direct current power supply 21. A differential voltage between the switching transistor 22C and 22A connection point B and the switching transistor 22B and 22D connection point A is output between the two resistors 31 and 32. A voltage signal EG, indicating this voltage is supplied to the electrical discharge detector 30. The voltage signal EG level is approximately equal to the direct current power supply 21 voltage E when electrical discharge has not yet occurred, and becomes smaller than the voltage E when an electrical discharge current flows in the gap 5, due to the voltage drop across the resistor 23. The electrical discharge detector 30 compares the level of the voltage signal EG to a reference voltage level, and supplies an output signal K to the second pulse generator 13 and the control circuit 24. The output signal K shows a "0" level only when the machining current I is flowing in the gap 5.

Figure 2:
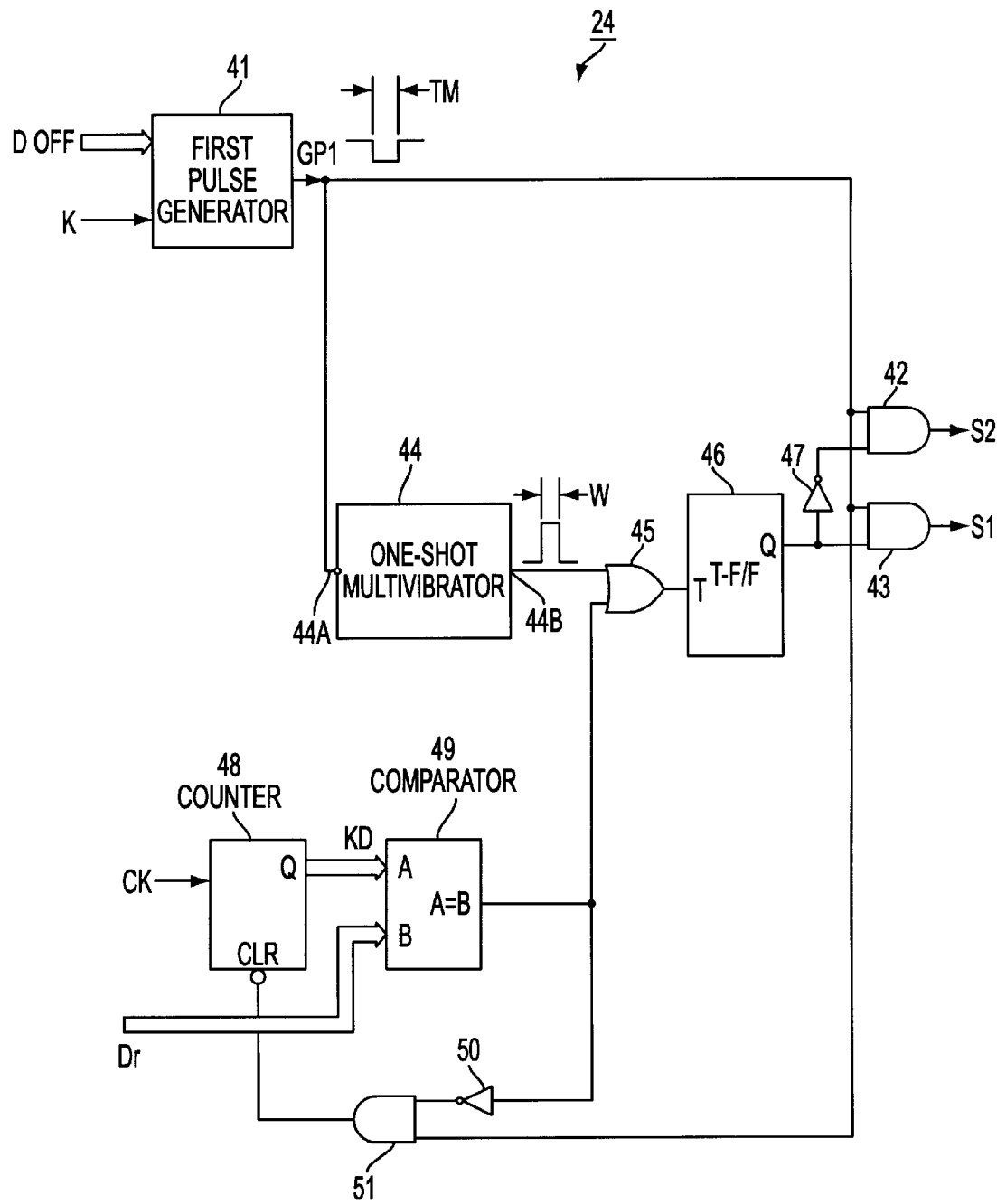
FIG. 2 is a circuit diagram illustrating the control circuit in FIG. 1.

Details of the control circuit 24 are explained below with reference to FIG. 2. The control circuit 24 comprises a first pulse generator 41, which supplies a gate pulse signal GP1 when one of the pairs of switching transistors 22A and 22D or 22B and 22C is on. Voltage pulses from the direct current power supply 21 are supplied to the machining gap 5 in response to a "1" level signal GP1. The pulse signal GP1 indicates a "0" level for only the duration TM immediately after the level of signal K has changed from a "1" to a "0." Data Doff, which indicate the duration TM, is applied externally to the first pulse generator 41. The pulse signal GP1 is supplied to AND gates 42, 43, and 51, and to an output 44A of a one-shot multivibrator 44.

The one-shot multivibrator 44 responds to the change in the pulse signal GP1 level from "1" to "0," and supplies a "1" level pulse signal having a time width W at an output 44B thereof. When a pulse signal from the one-shot multivibrator 44 is supplied to the input pin T of a T flip-flop 46 through an OR gate 45, the level at output pin Q on the T flip-flop 46 is switched. When just one of the two states is held, and a signal is supplied externally to the input pin T, the T flip-flop 46 switches its internal state. The T flip-flop 46 output pin Q is connected to the AND gate 42 through an inverter 47, and also to the AND gate 43. The output signal S1 of the AND gate 43 is fed to the pair of switching transistors 22A and 22D, and the output signal S2 of the AND gate 42 is fed to the pair of switching transistors 22B and 22C.

The control circuit 24 further comprises a binary counter 48, which supplies two-digit data KD indicating the total number of clock pulses transmitted from a clock pulse generator (not shown). A comparator 49 compares the two digit data KD received at the input pin A with the two-digit data Dr received at the input pin B. The data Dr determines the duration TW of the high frequency voltage pulse. The comparator 49 output pin A=B level indicates a "1" KD when data reaches the value Dr. When the output at pin A=B of the comparator 49 is a "1" level, and is supplied to the T flip-flop 46 input pin T through the OR gate 45, the level of the T flip-flop 46 output pin Q is switched. In other words, the level of the T flip-flop 46 output pin Q is switched each interval TW. The output pulse at A=B is also supplied to the counter 48 reset pin through an inverter 50 and an AND gate 51. When the counter 48 receives a "0" level signal at the reset pin CLR thereof, i.e., when the output value at pin A=B goes to "1", its count is returned to "0."

The operation of the control circuit 24 and the second pulse generator 13 shown in FIG. 1 is explained below with reference to FIGS. 3(A), 3(B), 3(C), 3(D), 3(E), 3(F), 3(G), 3(H), and 3(I).

Steps S100 to S170 in FIG. 5 depict the operation of the control circuit 24. At step S100, when the Q output of the T flip-flop 44 illustrated in FIG. 3(G) indicates a "0" level at time to, the process advances to step S110. In step S110, as illustrated in FIG. 3(I) and FIG. 3(H), at time t0 the AND gate 42 output signal S2 is at a "1" level and the AND gate 43 output signal a "0" level. At this time, therefore, the switching transistors 22B and 22C are on, and 22A and 22D are off and, as illustrated in FIG. 3(D), straight polarity voltage pulses are applied to the gap 5. When the first pulse generator 41 receives a signal K indicating a "1" level at step S120, which is to say when no electrical discharge is being generated at the gap 5, the process advances to step S130. When a duration TW determined by the data Dr in step S130 elapses, the T flip-flop 46 responds in step S140 to the "1" level output pulse A=B, and the level of the output pin Q thereof changes from "0" to "1."

For example, when the data Dr supplied to the input pin B on the comparator 49 is set to "3," the comparator 49 will cause the output A=B level to change from "0" to "1" at the time t1, at which time the counter 48 has counted three clock pulses CK, as illustrated in FIGS. 3(E) and 3(F). The output pulse A=B returns the counter 48 total to zero, so the comparator 49 supplies a pulse signal for each 3 clock pulses, as shown in FIG. 3(F).

Following step S140, the T flip-flop 46 output pin Q level is at a "1" in step S100, so the process advances to step S112. In step S112, as illustrated in FIGS. 3(I) and 3(H), at time t1 the AND gate 42 output signal S2 is at a "0" level and the AND gate 43 output signal S1 shows a "1" level. Therefore at this time switching transistors 22A and 22D are on, and switching transistors 22B and 22C are off, and reverse polarity voltage pulses are applied to the gap 5. Thus, as shown in FIG. 3(D), the polarity of the voltage pulses applied to the gap 5 changes at times t1, t2, t3, and t4 until electrical discharge occurs. At time t4, the level of the T flip-flop 46 output pin Q changes from "1" to "0."

As illustrated in FIG. 3(A), when the level of signal K changes from "1" to "0" at time t5 in step S120, the process advances to steps S150 and S160. At step S150, as shown in FIG. 3(C), at time t5 the pulse signal GP1 level changes from "1" to "0". During the inactive period TM, the pulse signal GP1 is at a "0" level, and the output signals S1 and S2 for the AND gates 43 and 42 respectively, are also at a "0" level. Therefore all of the switching transistors 22A, 22B, 22C, and 22D are off during the inactive period TM from time t5 to time t7, and the direct current power supply 21 is cut off from the gap 5. In step S160, the one-shot multivibrator 44 supplies its output signal to the input pin T of the T flip-flop 46, so the output pin Q thereof changes from "0" to "1" level. Following step S160, at step S170, as illustrated in FIG. 3(C), at time t7 the pulse signal GP1 level changes from "0" to "1". As a result, the T flip-flop 46 output pin Q level is at a "1" level at time t7, and the AND gate 43 causes a "1" level signal GP1 to be passed through as the signal S1. The technical significance of step S160 is that the polarity of the voltage pulse supplied from direct current power supply 21 at time t7 is caused to be the reverse of the voltage pulse polarity supplied between times t4 and t5. The electrolytic effect is thus suppressed by the voltage pulse first applied to the gap 5 after the end of electrical discharge, irrespective of the length of electrical discharge wait time. In the embodiment illustrated in FIG. 2, the one-shot multivibrator 44 causes the T flip-flop 46 output Q level to change as soon as electrical discharge is detected, but the T flip-flop 46 output Q level may be changed at anytime during the pulse signal GP1 inactive period TM.

Steps S200 to S230 in FIG. 5 depict the operation of the second pulse generator 13. When the electrical discharge detector 30 output signal K indicates a "0" level in step S200, the second pulse generator 13 output signal GP2 level changes at step S210 from "0" to "1," and as a result the switching transistor 12 is turned on. As shown in FIGS. 3(A) and 3(B), the pulse signal GP2 again shows a "0" level at time t6, after a time TN has elapsed following its change from "0" to "1." When time TN elapses in step S220, the switching transistor 12 turns off in response to a "0" level signal GP2 in step S230.

Referring now to FIGS. 4(A), 4(B), 4(C), 4(D), and 4(E), the operation of the second pulse generator 13 and the control circuit 24 are explained in further detail. FIGS. 4(A) and 4(E) are timing charts respectively illustrating the voltage Vgap and the current I flowing at the machining gap. FIGS. 4(B), 4(C), and 4(D) are timing charts respectively illustrating switching transistor control signals GP2, S1, and S2.

In the illustrated embodiment, application of the direct current power supply 21 voltage pulses begins at times ta, tc, 30 and te, and electrical discharge begins at times tb, td, and tf. Some time is required to detect the occurrence of electrical discharge, so the pulse signal GP2 level changes from "0" to "1" after a slight delay following the start of electrical discharge, as illustrated in FIG. 4(D). Similarly, as illustrated in FIGS. 4(B) and 4(C), the pulse signal GP1 level changes from "1" to "0" after a slight delay following the start of electrical discharge. When the T flip-flop 46 output Q indicates a "1" level, the pulse signal GP1 is supplied to one pair of switching transistors 22A and 22D through the AND gate 42 as the signal S2; when the output Q indicates a "0" level, the pulse signal GP1 is supplied to the other pair of switching transistors 22B and 22C as the signal S2, passing through the AND gate 42. The voltage pulse from the direct current power supply 21 has a duration of 1 to 100_sec. As is illustrated in FIGS. 4(B) and 4(C), the signals S1 and S2 are continuously alternately applied. As a result, as is shown in FIG. 4(A), a voltage pulse of one polarity is applied alternately with a voltage pulse of the opposite polarity to the gap 5 from the direct current power supply 21. Therefore electrolytic effects are suppressed by the first voltage pulse supplied by the direct current power supply 21 after electrical discharge ends, irrespective of the length of the electrical discharge waiting period. Furthermore, the switching transistors 22A, 22B, 22C, and 22D all turn off after electrical discharge is detected, so the machining current I does not flow from the machining current supply 10. Therefore efficient machining current I is supplied to the gap.

We claim:

1. In an electrical discharge machining apparatus for machining a workpiece by generating an electrical discharge in a machining gap formed between a workpiece and a tool electrode, the electrical discharge machining apparatus comprises:

an electrical discharge detection device for detecting electrical discharges occurring at the machining gap;

a pulse generator for generating a pulse signal and responsive to the electrical discharge detector to interrupt said pulse signal after electrical discharge commences;

a first voltage pulse application means responsive to the pulse signal for applying a voltage pulse of one polarity to the machining gap;

a second voltage pulse application means responsive to the pulse signal for applying a voltage pulse of the opposite polarity to the machining gap;

a state-retaining means for retaining either or a first or a second state;

a gate means for supplying a pulse signal to said first voltage pulse application means when the first state is retained in said state retaining means, and for supplying a pulse signal to a second voltage pulse application means when the second state is retained in said state retaining means;

a means for changing the state in said state retaining means while the pulse signal is ongoing;

a means for changing the state retained in said state retaining means from one to the other state each time the pulse signal is interrupted; and a machining current supply, responsive to the electrical discharge detector, for supplying machining current to the machining gap after electrical discharge commences.

2. The electrical discharge machine of claim 1, wherein said machining current supply section comprises a direct current power supply (11), a second pulse generator (13) responsive to the electrical discharge detector for generating a second pulse signal after electrical discharge commences, and a switching means (12), responsive to said second pulse signal, for controlling the machining current flowing from the direct current power supply through the machining gap.

3. A method for machining a workpiece by generating electrical discharges in a machining gap formed between a workpiece and a tool electrode, the electrical discharge machining method comprising:

detecting electrical discharge occurring at the machining gap;

alternately applying voltage pulses of one polarity and the opposite polarity to the machining gap until commencement of electrical discharge is detected;

retaining the polarity of the voltage pulse which was applied when commencement of electrical discharge is detected;

interrupting the application of said alternating polarity voltage pulses to the machining gap when commencement of electrical discharges is detected;

supplying a machining current to the machining gap to maintain said electrical discharges after commencement of electrical discharge is detected; and alternately applying voltage pulses of one polarity and the opposite polarity to the machining gap after an electrical discharge machining operation is stopped starting with a pulse having a polarity opposite to the retained polarity of the pulse applied when the commencement of electrical discharge was detected.

* * * * *